(12) United States Patent
Somers

(10) Patent No.: US 9,365,250 B1
(45) Date of Patent: Jun. 14, 2016

(54) ATTACHABLE TRACK OVERLAY APPARATUS

(71) Applicant: John Somers, Coatesville, PA (US)

(72) Inventor: John Somers, Coatesville, PA (US)

( * ) Notice: Subject to any disclaimer, the term of this patent is extended or adjusted under 35 U.S.C. 154(b) by 56 days.

(21) Appl. No.: 14/053,774

(22) Filed: Oct. 15, 2013

(51) Int. Cl.
*B62D 55/275* (2006.01)
*B62D 55/28* (2006.01)

(52) U.S. Cl.
CPC .............. *B62D 55/275* (2013.01); *B62D 55/28* (2013.01)

(58) Field of Classification Search
CPC ....... B62D 55/275; B62D 55/28; B62D 55/18
USPC .............. 305/51; 180/9.1, 9.5, 9.46, 9.52, 9.6
See application file for complete search history.

(56) References Cited

U.S. PATENT DOCUMENTS

| | | | | |
|---|---|---|---|---|
| 7,377,601 B2 * | 5/2008 | Katoh | ................... | B62D 55/253 305/161 |
| 8,256,540 B1 * | 9/2012 | Copeland | ............. | B62D 55/084 180/9.1 |

FOREIGN PATENT DOCUMENTS

CA    2690367    *   7/2011

* cited by examiner

*Primary Examiner* — S. Joseph Morano
*Assistant Examiner* — Jean Charleston
(74) *Attorney, Agent, or Firm* — Williams Intellectual Property; Benjamin F. Williams

(57) ABSTRACT

An attachable track overlay apparatus that includes a parallelepiped member sized appropriate to fit into a track bed of an extant track machine track, said parallelepiped member securable therein by hooked engagement of a first end around an interior side of said track, and rotational engagement of a lock member disposed at a second end of said parallelepiped member for selective engagement around an outer side of said track, whereby a rubberlike pad disposed atop the parallelepiped member is secured in a plane parallel with the track bed and elevated relative each of a pair of extant grouters disposed upon the track, whereby a tractable surface is installable covering a track for operation of a particular track machine over ground surfaces otherwise susceptible to damage by operation of the track machine thereupon.

8 Claims, 6 Drawing Sheets

ATTACHABLE TRACK OVERLAY APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of track apparatuses are known in the prior art. However, what is needed is an attachable track overlay apparatus that includes a parallelepiped member sized appropriate to fit into a track bed of an extant track machine track, said parallelepiped member securable therein by hooked engagement of a first end around an interior side of said track, and rotational engagement of a lock member disposed at a second end of said parallelepiped member for selective engagement around an outer side of said track, whereby a rubberlike pad disposed atop the parallelepiped member is secured in a plane parallel with the track bed and elevated relative each of a pair of extant grouters disposed upon the track, whereby a tractable surface is installable covering a track for operation of a particular track machine over ground surfaces otherwise susceptible to damage by operation of the track machine thereupon.

FIELD OF THE INVENTION

The present invention relates to a attachable track overlay apparatus, and more particularly, to a attachable track overlay apparatus that includes a parallelepiped member sized appropriate to fit into a track bed of an extant track machine track, said parallelepiped member securable therein by hooked engagement of a first end around an interior side of said track, and rotational engagement of a lock member disposed at a second end of said parallelepiped member for selective engagement around an outer side of said track, whereby a rubberlike pad disposed atop the parallelepiped member is secured in a plane parallel with the track bed and elevated relative each of a pair of extant grouters disposed upon the track, whereby a tractable surface is installable covering a track for operation of a particular track machine over ground surfaces otherwise susceptible to damage by operation of the track machine thereupon.

SUMMARY OF THE INVENTION

The general purpose of the attachable track overlay apparatus, described subsequently in greater detail, is to provide an attachable track overlay apparatus which has many novel features that result in an attachable track overlay apparatus which is not anticipated, rendered obvious, suggested, or even implied by prior art, either alone or in combination thereof.

Heavy plant equipment used in construction, demolition, and other industrial processes, often includes steel tracks for operation over, and increased traction upon, undeveloped ground surfaces. Problems arise when a track machine, such as a track hoe or other heavy plant equipment or machinery propelled by tracks, is operated upon a road surface, concrete, graded, constructed or finished surface, or other ground surface upon which operation of a track machine may render damage, whereby costly repairs and repeated efforts may thence be required. Construction crews typically throw down lumber over which to relocate a track machine, or load the track machine into a suitable trailer for transport. However both these practices present problems, such as lost time in loading and unloading, additional expense required to utilize such a transport vehicle, and damage resultant to a ground surface under lumber when operating a track machine thereover—for lumber and other intermediate media typically used to prevent damage to a road surface when operating a track machine thereover are often ineffective. What is needed is an attachable track overlay apparatus securable to a track to present a tractable surface for displacement of the weight of a track machine when operating it over a ground surface whereby damage rendered the ground surface is preventable. Such an attachable track overlay apparatus enables expedient relocation of a track machine between job sites without risking damage to an intervening ground surface while obviating the need of a separate transport vehicle altogether.

The present attachable track overlay apparatus, therefore, has been devised to enable expedient installation to a track of a track machine and enable operation of said track machine over ground surfaces otherwise damageable by the track acting directly thereupon.

The present attachable track overlay apparatus includes a parallelepiped member attachable to a track bed, sized appropriate to cover the track bed between each of the pair of track grouters disposed along either side of said track bed. A rubberlike pad is disposed covering a first surface of the parallelepiped member, said rubberlike pad disposed in a plane horizontal with said track bed and elevated above each of the pair of grouters disposed on either side thereof, which rubberlike pad thereby engages with the ground surface during operation of the track machine. A plurality of attachable track overlay apparatuses in contemplated herein, each of said plurality of attachable track overlay apparatuses fittable within each track bed to cover the track appropriate for operation upon a ground surface damageable by use of a track machine directly thereupon.

For simplicity of explanation of the instant attachable track overlay apparatus, a single such attachable track overlay apparatus will be subsequently described.

The present attachable track overlay apparatus includes a parallelepiped member disposed for attachment in a track bed, said parallelepiped member including a first end, a second end, a first surface, and a second surface. A hook member is disposed endwise at the first end for engagement around an interior side of a track whereby the parallelepiped member is securable within a track bed by rotational engagement of a lock member disposed endwise upon the parallelepiped member second end, as will be subsequently described.

The hook member includes a vertical section disposed endwise at the parallelepiped member first end and an overhang portion disposed endwise upon the vertical section, said overhang portion disposed in a plane parallel with the parallelepiped member second surface. The hook member thereby engages around the interior side of a track and engages the track between the overhang portion and the second surface of the parallelepiped member.

The lock member, disposed endwise at the parallelepiped member second end, is disposed for releasable securement to an outer side of the track. The lock member includes a hemicircular brace member disposed conjunct the second end of the parallelepiped member and a hemicircular base member disposed rotatably underlying the brace member. The base member is rotatable between an unlocked position, disposed underlying the brace member, and a locked position, rotated laterally from the brace member to underlie the track.

The brace member includes a vertical surface disposed conjunct the parallelepiped second end, an arced lateral surface disposed circumferentially therefrom, an upper surface, and an undersurface. The undersurface is disposed in a plane parallel with the overhang portion of the hook member.

The base member includes a diametric surface and a circumferential surface and is rotatable through one-hundred-and-eighty degrees from the unlocked position and the locked position. When rotated to the locked position, the circumferential surface is disposed underlying the track and engages said track between the base member and the second surface of the parallelepiped member.

For securable engagement in the locked position, a lock pin is compressibly disposed against the action of a spring member within a cylindrical cavity disposed in the base member. The spring member is thus forcibly engaged against the brace member and moveable within an arced channel disposed in the brace member undersurface between a first depression, disposed at one end of the channel, and a second depression, disposed at the other end of the channel, when the base member is rotated between the unlocked position and the locked position.

The first depression is a shallow concavity relative the depth of the channel, and the lock pin is readily moveable from the first depression into the channel by rotation of the base member from the unlocked position. Rotation of the base member to the locked position positions the lock pin into the second depression, which second depression is rendered deeper than the depth of the channel, and the lock pin is forcibly positioned within the second depression by action of the spring member.

The channel further includes a sloped section disposed proximal the second depression. Travel of the lock pin within the channel during rotation of the base member from the unlocked position to the locked position positions the lock pin along a negative gradient of the sloped section for engagement in the second depression. Rotation of the base member from the locked position to the unlocked position engages the lock pin along a positive gradient up the sloped section into the channel, and compresses the lock pin within the cylindrical cavity for travel of the base member to the unlocked position.

To effect torque and rotate the base member relative the brace member, a handle member is attachable to the base member by insertion into each of a first insertion hole and a second insertion hole. The first insertion hole is disposed upon the circumferential surface of the base member, and the second insertion hole is disposed in the diametric surface of the base member in a perpendicular orientation relative the first insertion hole.

When the base member is in the unlocked position, insertion of the handle into the first insertion hole enables rotation of the base member to the locked position. Once in the locked position, use of the second insertion hole, disposed upon the diametric surface of the base member, is operable to move the base member from the locked position to the unlocked position with the handle member unimpeded by situation of attachable track overlay apparatuses adjacently installed to the track.

Thus, a plurality of attachable track overlay apparatuses is installable in each track bed of an extant track to prevent damage to an underlying ground surface over which operation, or relocation, of the particular track machine is desired. Each attachable track overlay apparatus is installable in an associated track bed by insertion of the handle member into the relevant insertion hole, said handle member expediently released therefrom to effect installation of a subsequently positioned attachable track overlay apparatus. Each attachable track overlay apparatus is likewise expediently uninstalled, when desired, by insertion of the handle member into the second insertion hole for unimpeded operation of the handle member relative adjacently disposed attachable track overlay apparatuses.

Thus, the attachable track overlay apparatus expediently covers a track of an extant track machine to present a tractable surface for engagement against a particular ground surface whereon operation of the track machine may render significant and costly damage absent use of said attachable track overlay apparatus. Moreover, noise of operation of the track machine over such ground surface, such as a road surface, cement, or other graded or constructed surface, is reduced.

Thus has been broadly outlined the more important features of the present attachable track overlay apparatus so that the detailed description thereof that follows may be better understood and in order that the present contribution to the art may be better appreciated.

Objects of the present attachable track overlay apparatus, along with various novel features that characterize the invention are particularly pointed out in the claims forming a part of this disclosure. For better understanding of the attachable track overlay apparatus, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
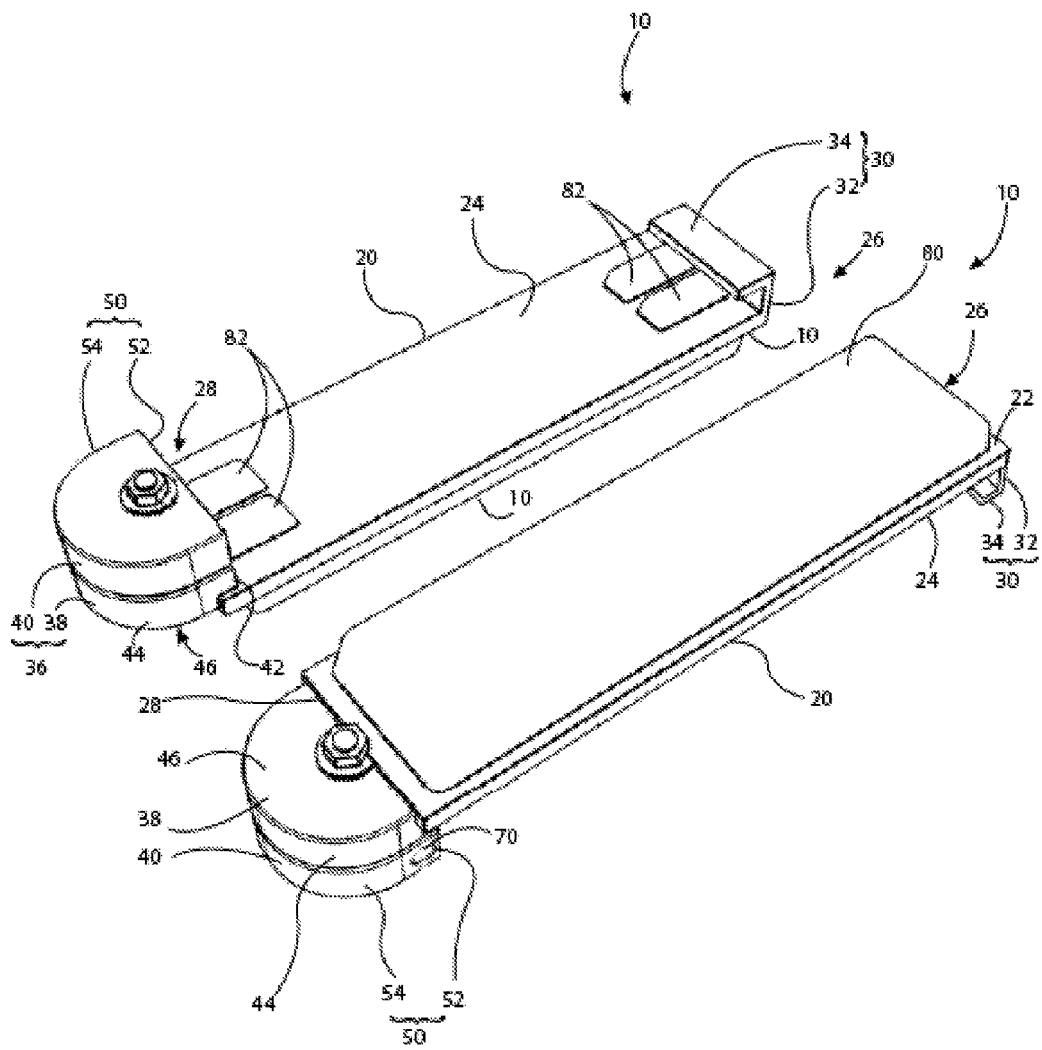
FIG. 1 is a top view and a bottom view.
Figure 2:
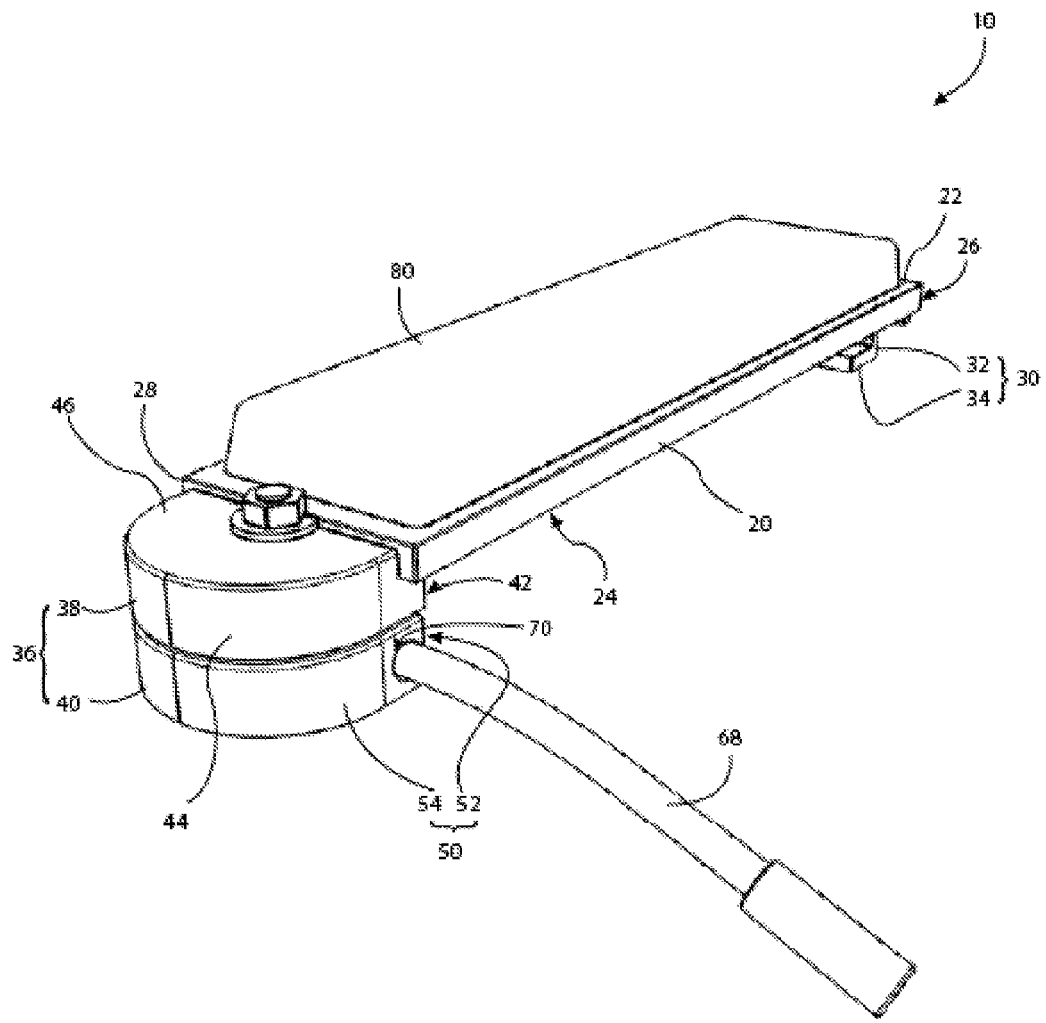
FIG. 2 is an isometric view.
Figure 3:
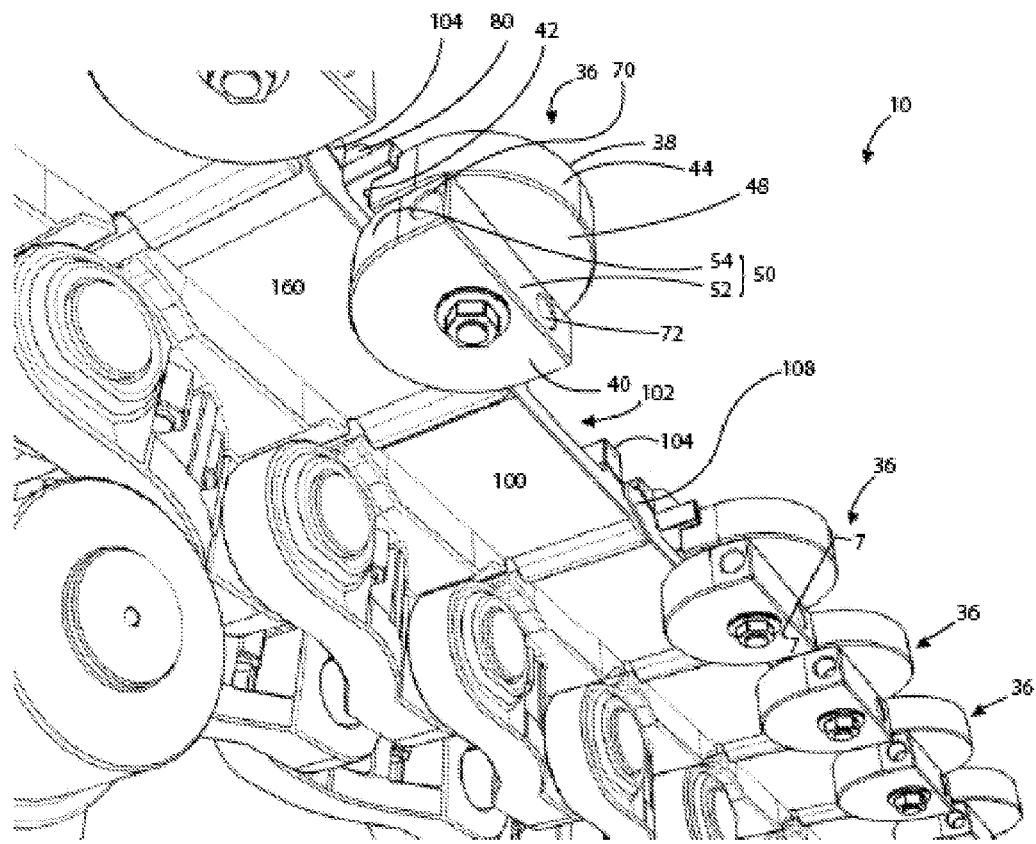
FIG. 3 is an in use view illustrating attachment of an attachable track overlay apparatus to a track bed of an extant track of a track machine.
Figure 4:
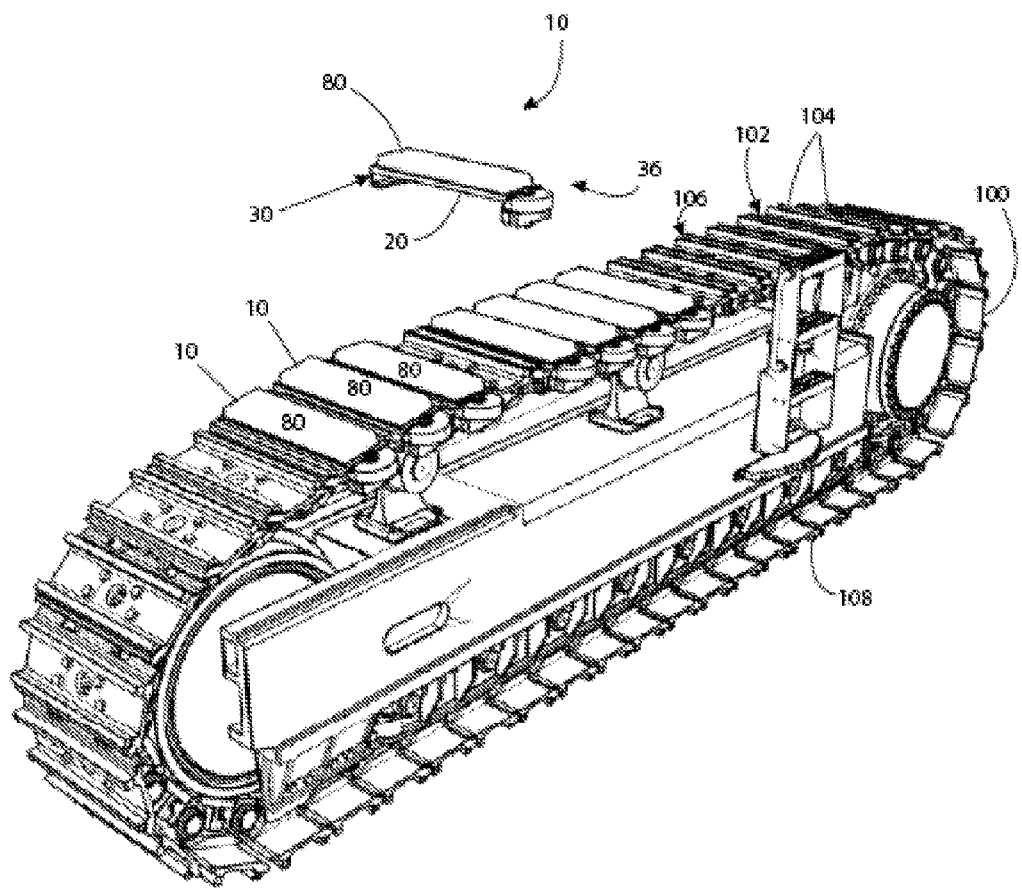
FIG. 4 is an in use view of a plurality of attachable track overlay apparatuses attached to a track.
Figure 5:
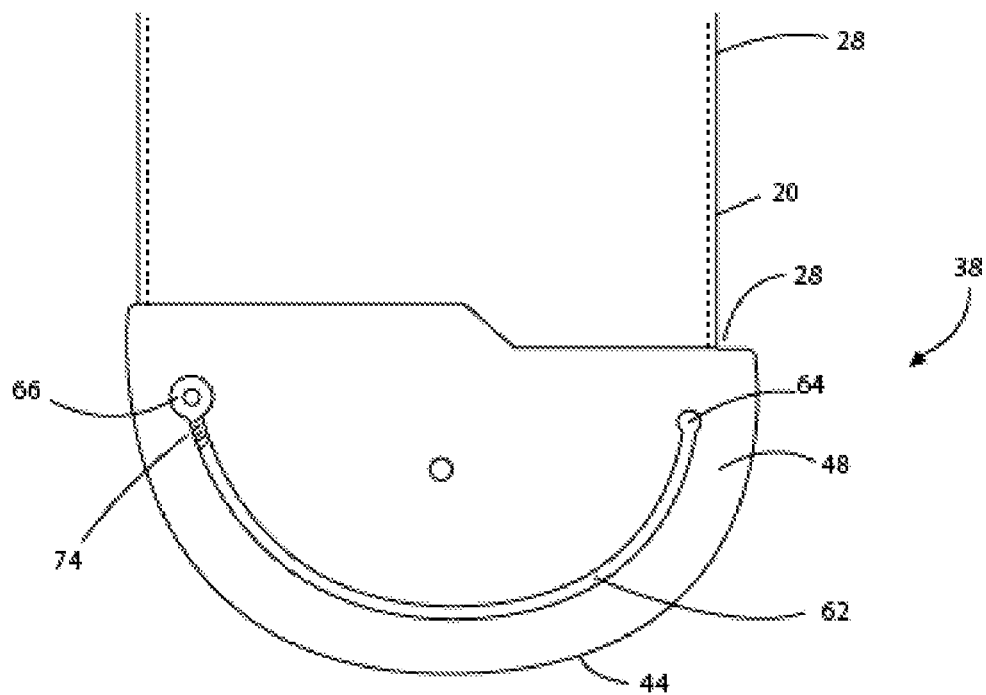
FIG. 5 is a bottom view of a brace member with a base member removed.
Figure 6:
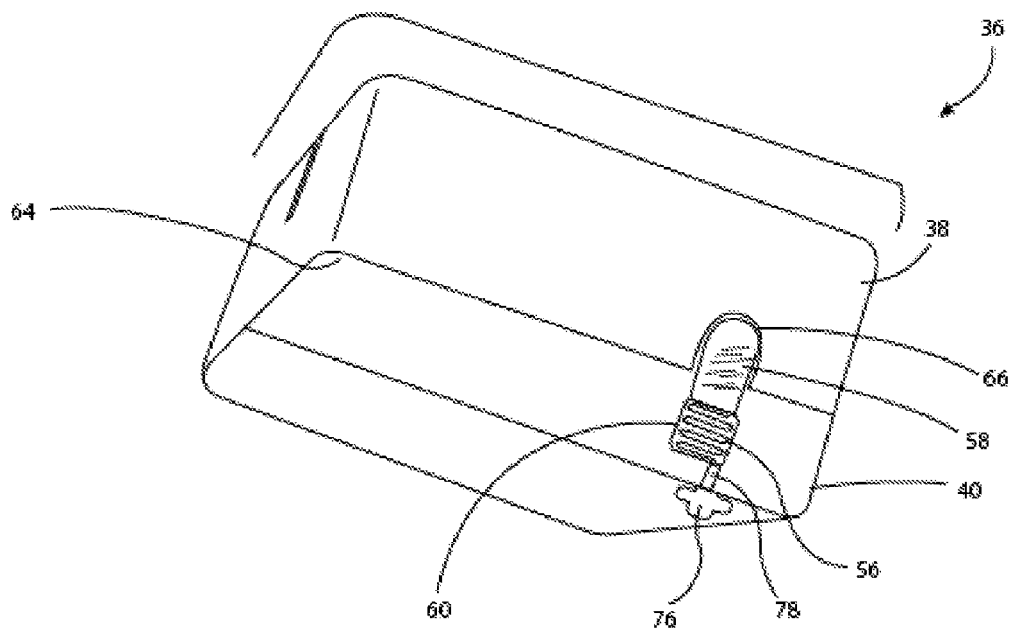
FIG. 6 is a cross section view of a lock member taken along the line 7-7 of FIG. 3.

With reference now to the drawings, and in particular FIGS. 1 through 6 thereof, example of the instant attachable track overlay apparatus employing the principles and concepts of the present attachable track overlay apparatus and generally designated by the reference number 10 will be described.

Referring to FIGS. 1 through 6 a preferred embodiment of the present attachable track overlay apparatus 10 is illustrated.

The present attachable track overlay apparatus 10 has been devised to enable releasable securement to a track 100 of an extant track machine. The present attachable track overlay apparatus 10 provides a tractable surface temporarily installable upon a track machine track 100 to lessen damage to a ground surface, such as a road surface or other ground surface, when operating a track machine thereon, or relocating said track machine across a particular ground surface that may otherwise be damageable by operation of a track machine thereupon.

The present attachable track overlay apparatus 10 releasably secures within a track bed 102 of an extant track 100 and presents a tractable rubberlike pad thereon for tractable engagement with a ground surface during operation of the track machine. A plurality of attachable track overlay apparatuses 10, therefore, is installable and removable, when desired, to enable a tractable surface between the track 100 and the underlying ground surface during operation of the track machine, as will be described subsequently.

The attachable track overlay apparatus 10, therefore, includes a parallelepiped member 20 having a first surface 22, a second surface 24, a first end 26, and a second end 28. The parallelepiped member 20 is sized appropriate for position within a track bed 102 of an extant track 100 between a pair of associated extant grouters 104, and the rubberlike pad is there positioned in a plane parallel with the track bed 102 in an elevated position above the height of the pair of grouters 104 disposed on either side of the parallelepiped member 20.

A hook member 30 is disposed endwise at the first end 26 of the parallelepiped member 20, said hook member 30 attachable to an interior side 106 of the extant track 100. The hook member 30 includes a vertical section 32, disposed endwise on the first end 26, and an overhang portion 34 disposed endwise upon the vertical section 32. The overhang portion 34 is disposed in a plane parallel with the second surface 28 of the parallelepiped member 20 and thereby hooks around the interior side 106 of the track 100, said track 100 thereby disposed between the overhang portion 34 and the parallelepiped member 20 second surface 24.

A lock member 36 is disposed endwise at the second end 28 of the parallelepiped member 20 and positional thereat to secure the parallelepiped member 20 within the track bed 102. The lock member 36 includes a hemicircular brace member 38 disposed in a plane parallel with the parallelepiped member and a hemiicular base member 40 rotatably disposed underlying the brace member 38.

The brace member 38 includes a vertical surface 42, disposed conjunct the second end 28 of the parallelepiped member 20, an arced lateral surface 44 disposed circumferentially therefrom, an upper surface 46, and an undersurface 48. The brace member 38 is fixedly disposed at the parallelepiped member 20 second end 28 and the undersurface 48 is disposed in a plane parallel with the overhang portion 34 of the hook member 30.

The hemicircular base member 40 is disposed underlying the brace member 38, there rotatably disposed and moveable between an unlocked position, underlying the brace member 38, and a locked position, rotated laterally therefrom to a position underlying the parallelepiped member 20. The base member 40 includes a lateral surface 50 comprising a diametric surface 52 and a circumferential surface 54. When moved between the unlocked position and the locked position, the circumferential surface 54 is rotated one-hundred-and-eighty degrees to underlie the parallelepiped member 20 (and thus engage a track 100 therebetween), and the diametric surface 52 is thus exposed tangential to the parallelepiped member 20 underlying the brace member 38. The base member 40 is therefore rotatable to engage the track 100, and the parallelepiped member 20 is thereby securable to the track bed 102, the track 100 engaged between the hook member 30 and the base member 40.

For securement of the base member 40 in the locked position, a cylindrical cavity 56 is vertically disposed in the base member 40 and a depressible lock pin 58 is compressibly disposed in the cylindrical cavity 56 against the action of a spring member 60. The lock pin 58 is disposed to travel along an arced channel 62, disposed in the undersurface 48 of the brace member 38, and is thereby positional between a respective first depression 64 and a respective second depression 66 disposed endwise upon said channel 62, wherein the base member 40 is securable between the respective unlocked position and the locked position.

The lock pin 58, therefore, is forcibly engaged into the second depression 66, by action of the spring member 60, when the base member 40 is rotated to the locked position. The base member 40 is thereby securable in the locked position and disposed to secure the parallelepiped member 20 to the track bed 102, the track 100 disposed between the hook member 30 and the base member 40.

To enable rotation of the base member 40 between the unlocked position and the locked position, a handle member 68 is releasably attachable to the base member 40 by insertion into each of a first insertion hole 70 and a second insertion hole 72 laterally disposed in the base member 40. The handle member 68 enables application of torque for pivotal engagement of the base member 40 between the unlocked position and the locked position.

The first insertion hole 70 is disposed in the circumferential surface 54 of the base member 40, proximal the first depression 64. The second insertion hole 72 is disposed in the diametric surface 52 of the base member 40, proximal the second depression 66. The first and second insertion holes 70, 72 are thus disposed perpendicularly relative each other, and enable rotation of the base member 40 by insertion of the handle member 68 therein, whereby action of the handle member 68 when rotating of the base member 40 is unimpeded by situation of adjacently disposed attachable track overlay apparatuses 10 subsequently installed to cover the track 100 of an extant track machine, as will be described subsequently.

When the base member 40 is disposed in the unlocked position, the lock pin 58 is positioned in the first depression 64 of the channel 62 disposed in the undersurface 48 of the brace member 38. The first depression 64 is shallow concavity relative the depth of the channel 62, and the lock pin 58 is readily moveable from the first depression 64 into the channel 62 when the base member 40 is rotated by action of the handle member 68. The lock pin 58 is thereby moveable through the channel 62 for engagement in the second depression 66. The second depression 66 is deeper than the first depression 64, and the lock pin 58 engages in the second depression 66 in full extension from the cylindrical cavity 56, forcibly maintained within the second depression 66 by action of the spring member 60.

The channel 62 further includes a sloped section 74 disposed proximal the second depression 66. Movement of the lock pin 58 along the channel 62 positions the lock pin 58 into the second depression 66 down the gradient of the sloped section 74. When the base member 40 is rotated from the locked position to the unlocked position, the lock pin 58 is successively depressed against the action of the spring member 60 by travel up the gradient of sloped section 74, thence moveable along the channel 62, and subsequently compressibly engaged within the shallow first depression 64.

To maintain fluidity of compressible extension of the lock pin 58 between the unlocked position and locked position, a bolt member 76 is removably positioned enclosing a grease fitting 78 disposed accessing the cylindrical cavity 56. The bolt member 76 is removable from the grease fitting 78 for addition of grease into the cylindrical cavity 56 whereby lubrication of the spring member 60 and lock pin 58, and exclusion of particulates from the cavity 56, is enabled.

The parallelepiped rubberlike pad 80 is disposed upon the first surface 22 overlying the parallelepiped member 20. When the parallelepiped member 20 is secured to a track bed 102, the rubberlike pad 80 is disposed in a plane overlying the bed 102 parallel with the track 100 at a position above the height of the extant track grouters 104 disposed on either side of the track bed 102. Thus, the attachable track overlay apparatus 10 presents a tractable surface for engagement with a ground surface when the extant track machine is operated over a particular ground surface to prevent damage rendered by the track 100 acting directly thereupon.

A plurality of attachable track overlay apparatuses 10 is thereby expediently fittable to the track beds 102 of an extant track machine to effectively cover the track 100, and a plurality of rubberlike pads 80 is therefore positional to tractably engage against the particular ground surface over which the track machine is operated.

For tractable engagement against the track 100, and tractably secure the parallelepiped member 20 to the track 100, a plurality of tractable members 82 is disposed on the second surface 24 of the parallelepiped member 20 for engagement against the track 100 when the parallelepiped member 20 is positioned and secured within a track bed 102. The plurality of tractable members 82 may include rubberlike material that compressively engages the parallelepiped member 20 to the track 100, when moved to the locked position, to prevent movement of the parallelepiped member 20 within the track bed 102 during use.

In use, therefore, a user places an attachable track overlay apparatus 10 to a particular track bed 102 of an extant track machine track 100 by first engaging the interior side 106 of the track 100 in the hook member 30 disposed endwise at the parallelepiped member 20 first end 26. The attachable track overlay apparatus 10 is sized appropriate for position within the track bed 102, and each of the associated track grouters 104 is disposed along either side of the attachable track overlay apparatus 10. The user then inserts the handle member 68 into the first insertion hole 70, disposed in the circumferential surface 54 of the base member 40, and rotates the base member 40 through one-hundred-and-eighty degrees, whereby the base member 40 is rotated to underlie an outer side 108 of the track 100. The diametric surface 52 of the base member 40 is thus positioned outfacing from the track 100 and the lock pin 58 secures the base member 40 in the locked position. The user then withdraws the handle member 68 from the first insertion hole 70, and positions a second attachable track overlay apparatus 10 in an adjacent track bed 102 and repeats the installation procedure until an attachable track overlay apparatus 10 is installed to each track bed 102.

After the particular track machine is moved to a desired location, and the attachable track overlay apparatuses 10 are no longer required for operation of the track machine without damage rendered a particular ground surface, the user inserts the handle member 68 into the second insertion hole 72, and rotates the base member 40 to the unlocked position. The second insertion hole 72 is disposed outfacing from the diametric surface 52 of the base member 40 and is, therefore, readily accessible to the user. The user may thus expediently remove each attachable track overlay apparatus 10 from each track bed 102 in succession with the action of the handle member 68 unimpeded by the situation of adjacently disposed attachable track overlay apparatuses 10.

What is claimed is:

1. An attachable track overlay apparatus attachable to an extant track of a track machine, said attachable track overlay apparatus comprising a parallelepiped member releasably attachable within a track bed of said track, said parallelepiped member having a hook member disposed endwise at a first end thereof for hooking engagement to the track of an extant track machine, a lock member disposed endwise at a second end of the parallelepiped member for releasable securement thereto, said lock member having a brace member disposed endwise upon the parallelepiped member and a base member rotatably disposed underlying the brace member, wherein rotation of the base member between an unlocked position and a locked position releasably secures the parallelepiped member to the track when a lock pin is forcibly engaged into a second depression disposed upon the brace member, said lock pin positional to the second depression when the base member is rotated to the locked position, whereby a rubberlike pad disposed overlying the parallelepiped member is disposed for tractable engagement with a ground surface during operation of the track machine and the parallelepiped member is removable therefrom when the base member is rotated to the unlocked position.

2. The attachable track overlay apparatus of claim 1 wherein the lock member further comprises:
    a channel disposed in an undersurface of the brace member, said channel disposed between a shallow first depression and the second depression;
    a cylindrical cavity vertically disposed in the base member, said vertical cavity including a spring member tensionally engaged against the lock pin therein disposed, said lock pin oriented to travel within the channel between the shallow first depression and the second depression when the base member is rotated between the unlocked position and the locked position;
    a first insertion hole disposed in a lateral surface of the base member;
    a second insertion hole disposed in the lateral surface of the base member in a perpendicular situation relative the first insertion hole; and
    a handle member attachable within the first and second insertion holes, said handle member positional therein for rotatable engagement of the base member between the unlocked position and the locked position;
    wherein the handle member is usable to effect rotation of the base member between the unlocked position and the locked position for releasable securement and selective release of the parallelepiped member to the track of a track machine.

3. The attachable track overlay apparatus of claim 2 wherein the brace member and the base member are hemicircular, said base member rotatable within a plane parallel with respect to the brace member and rotational thereat for lateral extension therefrom for engagement underlying the track when moved from the unlocked position to the locked position.

4. The attachable track overlay apparatus of claim 3 wherein the channel includes a sloped section proximal the second depression, whereby the lock pin travels into the second depression down the gradient of the sloped section when the base member is rotated to the locked position, said lock pin compressed into the cylindrical cavity by travel up the gradient of the sloped section against the action of the spring member when the base member is subsequently rotated to the unlocked position.

5. The attachable track overlay apparatus of claim 4 wherein the cylindrical cavity includes a grease fitting accessible by removal of a bolt member disposed enclosing said grease fitting for addition of grease thereinto, whereby lubrication of the spring member and lock pin, and exclusion of particulates from the cavity, is effected.

6. The attachable track overlay apparatus of claim 5 wherein the lateral surface of the base member includes a diametric surface and a circumferential surface.

7. The base member of claim 6 wherein the first insertion hole is disposed in the circumferential surface proximal the first depression and the second insertion hole is disposed in the diametric surface proximal the second depression in a perpendicular orientation relative the first insertion hole.

8. An attachable track overlay apparatus attachable to an extant track of a track machine, said attachable track overlay apparatus comprising:

a parallelepiped member having a first surface, a second surface, a first end, and a second end;

a hook member disposed endwise at the first end, said hook member comprising a vertical section disposed endwise at the first end and an overhang portion disposed endwise upon the vertical section, the overhang portion thereby disposed in a plane parallel with the second surface of the parallelepiped member;

a lock member disposed endwise at the second end, said lock member comprising:

a hemicircular brace member disposed parallel with the parallelepiped member, said brace member having a an undersurface;

a channel disposed in the brace member undersurface, said channel disposed between a shallow first depression and a vertically oriented second depression, said channel including a sloped section disposed gradiently into the second depression;

a hemicircular base member disposed underlying the brace member, said base member rotationally disposed thereat and moveable between an unlocked position underlying the brace member and a locked position rotated laterally therefrom;

a cylindrical cavity vertically disposed in the base member;

a depressible lock pin compressibly disposed in the cylindrical cavity against the action of a spring member, said lock pin traveling between the shallow first depression and the second depression along the channel when the base member is rotated between the unlocked position and the locked position;

a bolt member removably disposed enclosing a grease fitting disposed accessing the cylindrical cavity, said bolt member removable therefrom for addition of grease into the cylindrical cavity for lubrication of the spring member and lock pin and the exclusion of particulates therefrom;

a first insertion hole disposed in a circumferential surface of the base member proximal the first depression;

a second insertion hole disposed in a diametric surface of the base member proximal the second depression, said second insertion hole disposed perpendicularly relative the first insertion hole;

a handle member releasably attachable into said first and second insertion holes for pivotal engagement of the base member between the unlocked position and the locked position; and a parallelepiped rubberlike pad disposed upon the first surface overlying the parallelepiped member;

wherein the hook member hooks to an extant track of a track machine and the parallelepiped member releasably overlies a track bed of said extant track, said parallelepiped member releasably securable thereat when the base member is rotated by action of the handle member to the locked position, the lock pin thereat forcibly inserted into the second depression of the channel by action of the spring member when the base member is rotated to the locked position, whereby the rubberlike pad is disposed overlying the track bed for tractable engagement with a ground surface and the parallelepiped member is removable therefrom when the base member is moved to the unlocked position.

\* \* \* \* \*